Aug. 4, 1953 N. SWERDLOW ET AL 2,647,940
METAL ENCLOSED BUS WITH ADJUSTABLE BUS CLAMPING MEANS
Filed Aug. 31, 1948 2 Sheets-Sheet 1
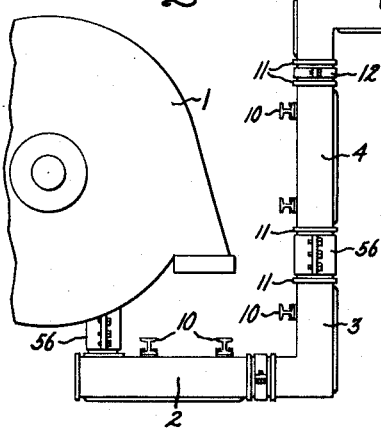
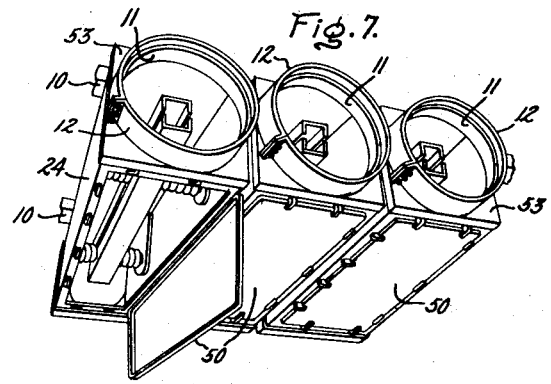
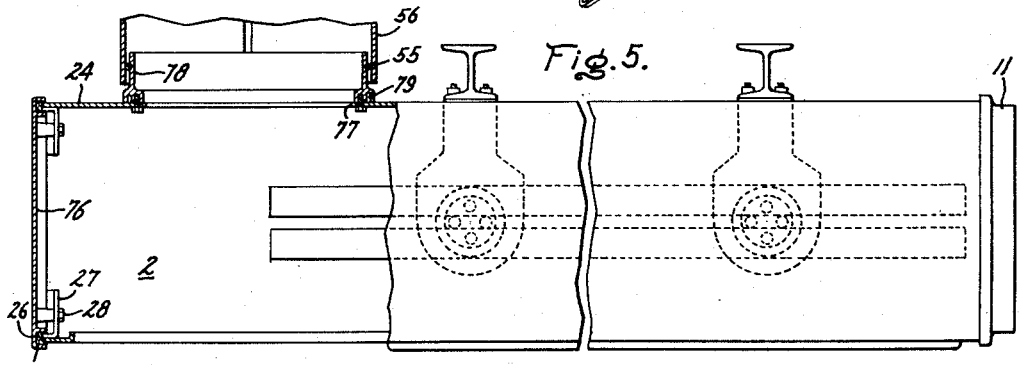
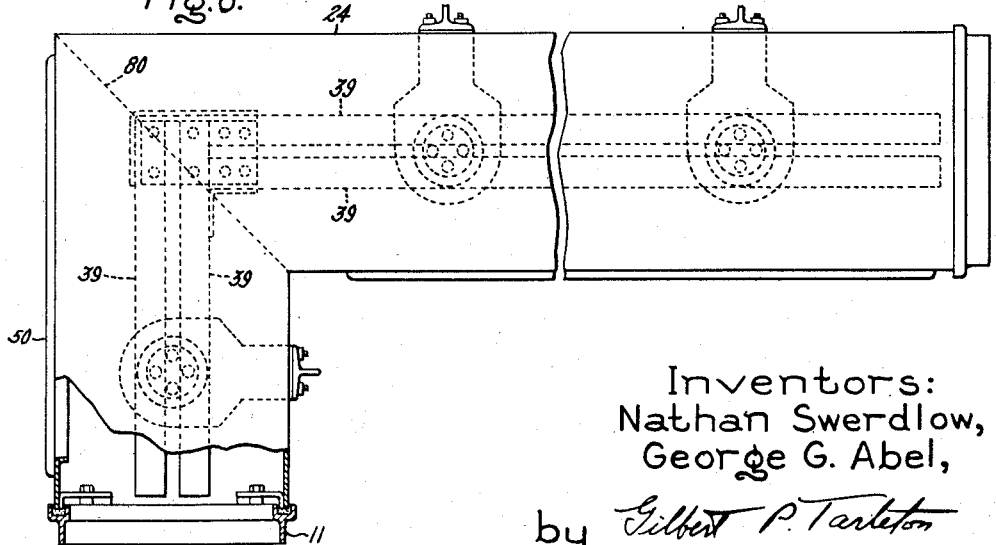
Inventors:
Nathan Swerdlow,
George G. Abel,
by Gilbert P. Tarleton
Their Attorneys.

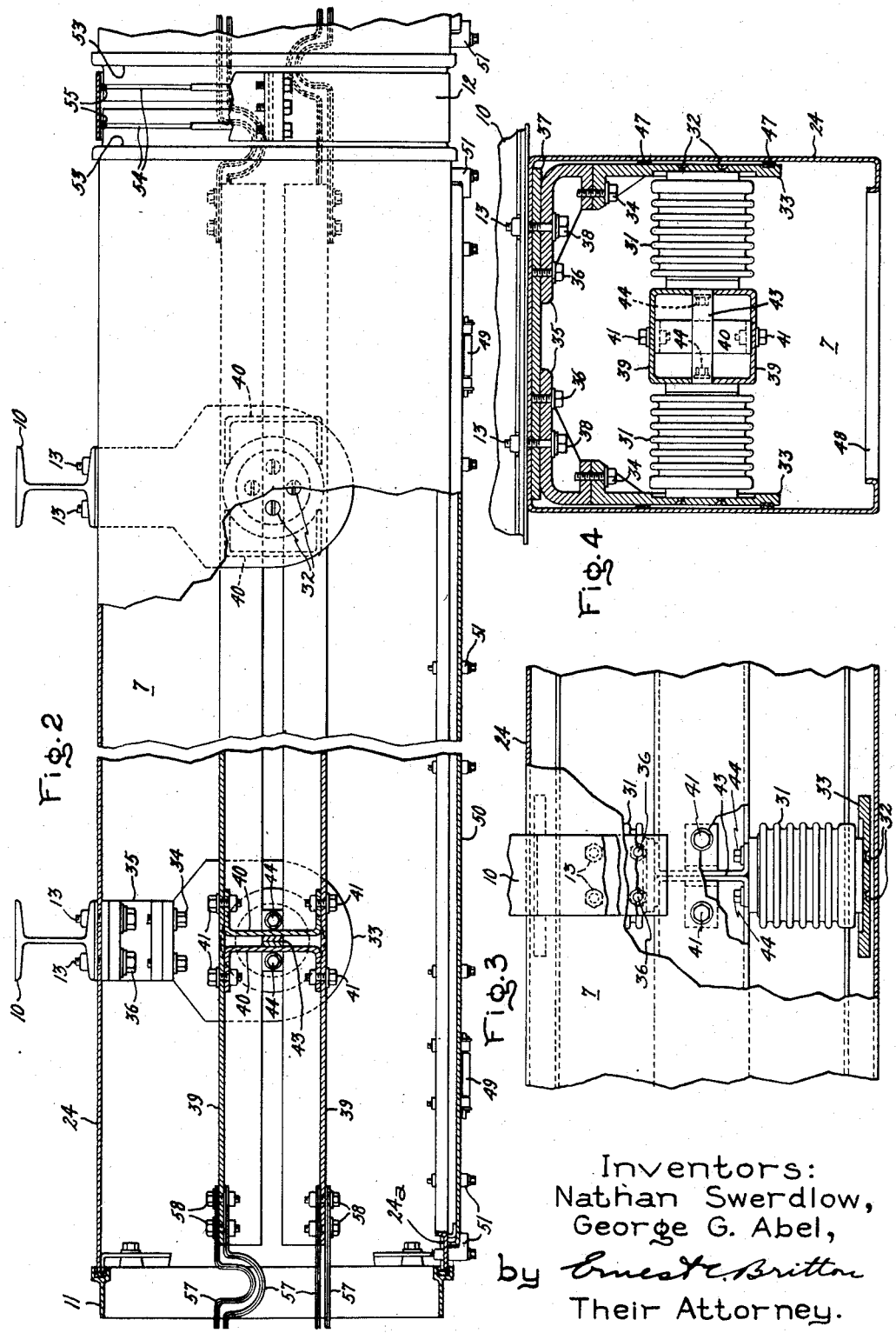

Patented Aug. 4, 1953

2,647,940

UNITED STATES PATENT OFFICE 2,647,940

METAL ENCLOSED BUS WITH ADJUSTABLE BUS CLAMPING MEANS

Nathan Swerdlow, Philadelphia, and George G. Abel, Media, Pa., assignors to General Electric Company, a corporation of New York Application August 31, 1948, Serial No. 47,128

9 Claims. (Cl. 174—99)

1

This invention relates to enclosed electric bus installations and more particularly to electric bus systems of the isolated phase type.

In bus installations such, for example, as are used in high capacity electric power generating stations, it is vital that a high degree of reliability be achieved in order that outage time may be minimized and, furthermore, it is desirable that all the parts of the bus system be arranged so as to be readily accessible for inspection and repair, if necessary, so as further to minimize undesirable outage time.

One object of our invention is the provision of an improved and efficient method of manufacturing electrical bus equipment of the isolated phase air insulated type which will meet the above requirements.

Another object of our invention is the provision of an improved method of manufacturing bus equipment wherein standardized individual units or sections of the system are factory assembled, thus making possible an expeditious installation procedure in the field.

Still another object of our invention is to provide a bus system in which the component parts of each unit thereof are readily adaptable for producing units of convenient straight or angular form and having end conjointing means which provide latitude during installation so that precise positioning or alignment of the pre-assembled units is not necessary.

A still further object of our invention is the provision of simple means for supporting the bus conductor within its enclosing sheath, which supporting means affords a sturdy support and which in addition is capable of accommodating differences in longitudinal expansion or contraction of the bus in the sheath with respect to the rigid mounting due to changes in temperature.

Further objects and advantages of our invention will become apparent as the following description proceeds and the features of novelty which characterize our invention will be pointed out with particularty in the claims annexed to and forming a part of this specification.

For a better understanding of our invention, reference may be had to the accompanying drawings in which Fig. 1 is a side view of a portion of a generating station showing the generator and a sectionalized bus run comprising the representative units designated by the numerals 2 through 9; Figs. 2, 3, and 4 are side, top, and sectional views respectively of units 4 and 7 of Fig. 1; Fig. 5 is a side view partially in section of unit 2 of Fig. 1; Fig. 6 is a side view partial-

2 ly in section of unit 5 of Fig. 1; and Fig. 7 is a perspective view showing a three-phase arrangement of units such as are represented by Figs. 2, 3, and 4.

With reference to Fig. 1 the numeral 1 designates a station power generator which is connected to a sectionalized bus run only one phase of which, for convenience, is shown. The units 2 through 9, comprising the single phase bus run, are supported by means of suitable I-beams 10 which in turn are secured to the station ceiling, walls, or other suitable supporting structure in any convenient manner, which is not shown. The sections or units 2 through 9 are factory assembled and all are alike in that they terminate at their respective ends in a projecting cylindrical flange 11. When the various units 2 through 9 have been mounted in their predetermined positions in the station, they may then be connected together at each junction by a clamping band 12 which embraces the separated flanges 11, the details of which will be more fully explained hereinafter. It will be understood that various combinations of the units 2 through 9 collectively constitute a conducting bus disposed axially within a square-sectioned box-like metallic sheath and that the conducting members therein are supported on insulators within the sheath. For a bus of high current carrying capacity, the sheath preferably is constructed of suitable non-magnetic material, such as aluminum.

It will further be understood that in such a station bus arrangement, longer bus runs than that depicted for illustration in Fig. 1 would usually be involved; accordingly, the major portion of the total length of the bus would be constituted by a number of "standard" units of some predetermined convenient short length of several feet. The numerals 4, 7, and 9 indicate typical identical units, and it will be observed that such standard straight units may be mounted vertically, horizontally or in any position for which suitable mounting structure has been provided. In accordance with our invention, the component parts of the standard units are such that they are readily adaptable for use with units possessing forms different from the straight type, such as, for example, the angle units indicated by the numerals 2, 3 and 5. Also, the rectangular box-like sheath with its short cylindrical end flanges lends itself readily to special purpose adaptations thereof such as will hereinafter be described as in the case of the units indicated by the numerals 6 and 8.

Standard units such as 4, 7, and 9 of Fig. 1, the details of which are shown in Figs. 2, 3, and 4, comprise the enclosing sheath 24 which is a sheet of aluminum formed into a long square box-like section open down one side as best shown in Fig. 4. At each end of the sheath, the open side is bridged across by an L-sectioned cross member 24a welded or otherwise permanently secured in place as best seen in Fig. 2. These cross members provide end landings for the unit cover and also complete the rectangular periphery of each end of the sheath for jointing into cooperating grooves of the end flange members 11 as will be more fully appreciated hereinafter. Within this sheath two pairs of insulators 31 are secured by screws 32 to pedestals 33. Pedestals 33 are removably secured by bolts 34 to the mounting brackets 35 which are secured in turn by bolts 36 to the metallic mounting pads 37 which are welded or otherwise secured permanently to the sheath 24. Thus, the sheath 24 carrying the welded pads 37 with the mounting brackets 35 bolted thereto may be regarded as comprising the foundation structure of the bus unit which is to be attached to the I-beams 10 and within which will be carried the bus conductor and its supporting means comprised by the insulators 31 with their pedestals 33. At this point it may be observed that the whole bus unit is to be secured rigidly to the I-beams 10 by the main mounting bolts 38 which effectively clamp the brackets 35 to the beams with the sheath 24 compressively secured therebetween. Preferably sealing washers (not shown) are provided around the bolts 38 for rendering the mounting bolt holes in the sheath gas-tight. Also, it here may be observed that either the bus conductors or their supporting insulators with pedestals 33 may at any time be unbolted, removed, and replaced within the sheath without disturbing the above-defined foundation structure on its I-beam supports. The bus proper, for most conventional current ratings in this class, may be made up of two opposed channel-like conductors 39 which are spaced fixedly apart by pairs of U-shaped members 40 secured therebetween by bolts 41 as best shown in Fig. 2. For a so-called "fixed" bus support, a pair of these U-shaped members 40 closely embrace another pair of U-shaped members 43 which bridge across each pair of insulators 31 and which are secured thereto by means of screws 44 as best shown in Fig. 3. The end flanges of U-shaped members 43 also serve as spacing means between the bus channels 39 as best seen in Figs. 2 and 4. For a "slip" joint, that is, one in which the bus conductor may move longitudinally with respect to its supporting insulators, the channel U-shaped members 40, being adjustable, are simply bolted in reversed positions so that their bight portions are remote from the U-shaped spacer members 43 as shown by dotted lines at the right-hand insulator station in Fig. 2. Thus from Fig. 4 it can be seen that the bus channels 39 are in engagement with the opposed ends of insulators 31 and hence cannot move from side to side. From Fig. 4 it is apparent that up and down movement is not possible because the U-shaped clamping members 40 hold the inturned portions of the channels 39 in engagement with the flanged portions of the U-shaped supporting spacers 43. By the arrangement shown in heavy lines at the left-hand station of Fig. 2, longitudinal movement of the channels 39 with respect to the insulators 31 is prevented due to the gripping engagement of the supporting spacers 43 by the clamping members 40, while limited longitudinal movement of the channels 39 with respect to the insulators 31 is possible by the arrangement shown in dotted lines at the right-hand station of Fig. 2 since the clamping members 40 are not in engagement with the spacers 43.

In view of the description thus far, it will be appreciated that the construction shown in Figs. 2, 3, and 4 is well adapted for producing factory assembled bus units in a very expeditious manner. For instance, an enclosing sheath 24 having the mounting pads 37 secured therein forms an enclosure which is well adapted for safely housing the assembled parts especially during shipment.

In assembling the component parts used in the construction shown by Figs. 2, 3, and 4, the U-shaped bridging members 43 are first secured by bolts 44 across an opposed pair of insulators 31 which may be already mounted upon their pedestals 33. The two channel-like conductors 39 are then bolted about each of the two pairs of insulators by means of the U-shaped members 40 to produce a "fixed" and "slip" support at one or the other insulator station respectively. The mounting brackets 35 already may have been bolted in their permanent positions within the sheath 24 by the bolts 36 to form the aforementioned foundation structure. The sub-assembly structure comprising the conductors 39 bolted about their insulators 31 and pedestals 33 is now inserted through one end of the sheath into its proper place therein and is then secured to the mounting brackets by means of the bolts 34. When this pre-assembled unit is mounted at its point of use, it is then only necessary to secure the composite assembly to a suitable I-beam, such as 10, by means of the bolts 38.

For preventing vibration or chatter of the relatively thin sheath side walls we have provided suitable damping pads 47 which, as best seen in Fig. 4, are glued or cemented to the pedestals 33 before the above-described assembly operation. These pads, which may be constructed of felt or other soft, yieldable material, serve as protective buffers as the bus sub-assembly is being guided into the sheath, for they resiliently engage the walls of the sheath 24.

After the above-described assembly operation, the end flange members 11 may be gasketed and bolted to the sheath ends; after which the about-to-be-described sheath covers are applied to complete the full assembly of an individual bus unit.

It will be apparent that the open side of the sheath indicated by 48 in Fig. 4 affords ready access to the bus channels and the various other parts within the sheath 25 during assembly, installation, and subsequent inspection.

This opening is closed and rendered dust-tight by means of a gasketed cover 50, of which the specific sealing means thereof will be described in detail later. This might be a simple bolted sheet cover but, for improved accessibility, we prefer to provide bolted turnable L-clamps, as indicated at 51 in Fig. 2, which are disposed at suitable intervals around the covers periphery. For further convenience, we provide the door 50 with a pair of hinges 49 upon each of its two long sides, with corresponding hinge lugs bolted to the sides of the opening 48 adjacent thereto. Accordingly, the hinge pins readily may be inserted through the hinges on either side of the door at any time or transferred from one side to the other, depending upon which side is found to be the preferable one in the field. Hinge pins have large clearance in the hinges to provide slack for compression of the door's gasket.

The high degree of accessibility afforded by the hinged doors of our novel bus units is best illustrated in Fig. 7, in which one door of a three-phase bus section is shown hanging open.

As mentioned earlier, each end of each bus unit is provided with a projecting cylindrical flange 11 as shown in detail in Fig. 2. This cylindrical flange member 11 conveniently comprises an aluminum adapter casting having a square frame-like portion 53 integral therewith, the rectangular peripheral groove of which accommodates a gasket for the reception of the square sheath end. Each sheath end and its flange member 11 are mounted rigidly by corner bolts, gussets, and lugs. Into the outer surface of each cylindrical flange 11 is machined an encircling groove 54 for the reception of a sealing ring 55 which is constructed of rubber or other equivalent resilient, insulating material. In the field, after the units are installed in spaced alignment, a metallic clamping band 12 is secured around the flanges 11 of adjoining bus units to compress the sealing rings 55, thereby to form a dust-tight union conjoining each sheathed bus unit to the next, such as between 6 and 7. This band 12 alternatively may be constructed as two similar halves which would be semi-circular, with suitable bolts and gaskets for connecting the abutting edges together instead of a single circular strap bolted together at a single point.

It will be understood that the flange casting 11 is manufactured as a standard interchangeable part and that nominal variations in the over-all length of the bus units and their end spacing are accommodated by the telescoping joint afforded by the clamping bands 12.

Although the nominal end spacing between units as illustrated at the right-hand end of Fig. 2 is on the order of one inch, it will be clear that it may be convenient to increase this spacing where desirable or necessary. In such a case, as shown by way of example in Fig. 1 between the units 3 and 4, a longer clamping band 56 can be substituted for the narrow "standard" band 12.

The ends of adjoining channel bus conductors 39 are provided with conventional flexible jumpers or connections 57 which are secured to the channels by the bolts 58. These flexible joints compensate for variations in length and alignment between adjoining bus units. Furthermore, each length of the conductor in each bus unit is free to expand or contract with respect to the enclosing sheath, depending upon the amount of current being carried and upon the ambient temperature. Such length variations would extend outwardly from the "fixed" bus support by virtue of the adjacent "slip" support and the above-described flexible connections.

As mentioned earlier, either one of the pair of insulators at each supporting point may be removed without affecting the other or disturbing the bus proper. To this end, the door clamps 51 are loosened and the door 50 opened about its hinges. By utilizing a suitable box-wrench which would be inserted through the space between the two opposed channels, the screws 44 may be removed. The bolts 34 would then be removed thereby freeing the insulator 31 together with its pedestal 33 which could then be lifted bodily out through the opening 48. Conversely, the lengths of this channel also may be unbolted and removed without disturbing the insulators.

As shown in Fig. 5, the unit 2 of Fig. 1 is constructed like the standard units 4 and 7, except that provision is made for an offset connection to the generator and the left-hand end of the sheath is sealed off by a square metallic plate casting 76 having a peripheral groove 25 with gasketing material 26 bedded therein. This end plate cover is secured to the sheath 24 by means of gussets 27 and corner bolts 28, as explained in connection with the very similar end flange member 11 of Fig. 2. For the offset, a side wall of the sheath 24 is provided with an opening 77 which may be circular or rectangular as desired.

Around this opening 77 is bolted a circular flanged side member 78 which is very similar to the standard flanged end member 11 provided at the opposite end of the sheath; the main difference being that member 78 requires a greater number of peripheral bolts than the four corner bolts of member 11 to produce a good seal along the thin sheath side wall. This side flange member 78 carries a gasket in its peripheral groove 79 while the usual ring gasket 55 provides the gas-tight seal for the long clamping bands 56 already referred to, which latter completes the metallic sheathing about the leads from the terminals (not shown) of the generator 1 as indicated in Fig. 1.

Where the bus must change direction, angled or L-units such as 3 and 5 of Fig. 1 may be used. A typical angle unit is shown in limited detail in Fig. 6 which is somewhat similar to Fig. 5 except that the sheath 24 is made continuous as by welding along the dotted line 80, and the conductors 39 are suitably connected together at the corner with the sheath by means of conducting splice plates as indicated.

The extremities of the angled sheath carry the standard end flanged members 11 which characterize the straight unit section as already described and shown in Fig. 2.

Although the foregoing detailed description has dealt with a single-phase bus run for simplicity, it will be understood that three-phase bus is more commonly employed in practice. In such cases, it will be readily appreciated that three identical single-phase bus units would be disposed in close side-by-side relationship which would depend from a pair of common I-beams 10 extending across the collective breadth of the three units somewhat as shown in Fig. 7. Convenient shipping units from factory to field therefore would be constituted by a trio of single bus units already bolted to their common I-beam supports, thereby reducing lineup and assembly work in the field to a practical minimum. Fig. 7 illustrates the high degree of accessibility afforded by the hinged cover 50 which virtually opens up one full size of the box-like sheath 24. When the bus unit sections have been bolted in place about the station, the junction straps 12 may then be affixed, after which all that remains to be done is the interconnecting of the bus conductor ends by their flexible jumpers 57. This operation is readily performed, for the opened covers 50 expose virtually the whole conductor run for access and inspection.

While we have shown and described particular aspects of our invention, it will be obvious to those skilled in the art that various changes and modifications may be made without departing from our invention and we, therefore, intend in the appended claims to cover all such changes and modifications as fall within the true spirit and scope of our invention.

What we claim is:

1. An arrangement for supporting a pair of spaced bus conductors within an enclosing sheath comprising a pair of insulators secured within said sheath and disposed in spaced relationship, supporting means including spacing support means disposed between opposed surfaces of said insulators and secured thereto, and clamping means including a pair of adjustable U-shaped members secured to opposed surfaces of said conductors with the bight portions thereof arranged to engage opposite sides of said support means for gripping said support means to prevent longitudinal movement of the bus with respect to said support means when said U-shaped members are adjusted in one position but not when said U-shaped members are adjusted in another position.

2. In combination, an elongated enclosing sheath, a pair of insulators secured within said sheath and disposed in spaced relationship, support means interposed between opposed surfaces of said insulators and secured thereto, a pair of elongated conducting members arranged in spaced substantially parallel relationship to each other and transversely disposed with respect to said insulators and with said support means interposed between said conducting members, and clamping means attached to opposed surfaces of said conducting members and engageable with said support means to secure said conducting members in position within said sheath.

3. In combination, an elongated enclosing sheath, a pair of insulators secured within said sheath and disposed in spaced substantially coaxial relationship, support means interposed between opposed surfaces of said insulators and secured thereto, a pair of elongated conducting members arranged in spaced substantially parallel relationship to each other and transversely disposed with respect to said insulators and with said support means interposed between said conducting members, and clamping means attached to opposed surfaces of said conducting members and engageable with said support means to secure said conducting members in position within said sheath, said clamping means being adjustable to a position in which said clamping means clamps said conducting members with respect to each other but in which said clamping means is out of engagement with said support means so as to accommodate axial movement of said clamped conducting members relative to said support means.

4. In combination, an elongated enclosing sheath, a pair of insulators secured within said sheath and disposed in spaced relationship, support means interposed between opposed surfaces of said insulators and secured thereto, a pair of elongated conducting members arranged in spaced substantially parallel relationship to each other and transversely disposed with respect to said insulators and with said support means interposed between said conducting members, and a pair of U-shaped clamps having the prongs thereof secured to opposed surfaces of said conducting members with the bight portions thereof disposed for engagement with opposite surfaces of said support means to prevent axial movement of said conducting members relative to said support means.

5. In combination, an elongated enclosing sheath, a pair of insulators secured within said sheath and disposed in spaced substantially coaxial relationship, support means interposed between opposed surfaces of said insulators and secured thereto, a pair of elongated conducting members arranged in spaced substantially parallel relationship to each other and transversely disposed with respect to said insulators and with said support means interposed between said conducting members, and a pair of U-shaped clamps having the prongs thereof secured to opposed surfaces of said conducting members with the bight portions thereof disposed for engagement with opposite surfaces of said support means to prevent axial movement of said conducting members relative to said support means, said clamps being adjustable to positions such that the bight portions thereof are spaced from said support means so as to accommodate axial movement of said conducting members relative to said support means.

6. In combination, an elongated enclosing sheath, a pair of insulators secured within said sheath and disposed in spaced substantially coaxial relationship, support means interposed between opposed surfaces of said insulators and secured thereto, a pair of elongated channel-shaped conducting members having inner opposed surfaces and arranged in spaced substantially parallel relationship to each other and transversly disposed with respect to said insulators and with said support means disposed between said conducting members, the flanges of said conducting members projecting inwardly toward said support means, and clamping means attached to said inner opposed surfaces of said conducting members and engageable with said support means to secure said conducting members in position within said sheath.

7. In combination, an elongated enclosing sheath, a pair of insulators secured within said sheath and disposed in spaced relationship, support means interposed between opposed surfaces of said insulators and secured thereto, a pair of elongated channel-shaped conducting members arranged in spaced substantially parallel relationship to each other and transversely disposed with respect to said insulators and with said support means disposed between said conducting members, the flanges of said conducting members projecting inwardly toward said support means, and a pair of U-shaped clamps having the prongs thereof secured to opposed surfaces of said conducting members with the bight portions thereof disposed for engagement with opposite surfaces of said support means to prevent axial movement of said conducting members relative to said support means.

8. In combination, a pair of spaced elongated conductors, an elongated enclosing sheath, a first pair of insulators secured within said sheath and disposed in spaced relationship, a second pair of insulators secured within said sheath and disposed in spaced relationship, said pairs of insulators being transversely disposed with respect to said conductors and being spaced from each other longitudinally of said sheath, spacing support means disposed between opposed surfaces of the insulators of each pair of insulators and secured thereto, said spacing support means being interposed between said conductors, first clamping means removably secured to opposed surfaces of said conductors and in engagement with the spacing support means of said first pair of insulators for anchoring said conductors thereto, and second clamping means secured to opposed surfaces of said conductors and in spaced relation to said spacing support means of said second pair of insulators so as to establish a lost motion relationship between said conductors and the spacing support means of said second pair of insulators in a direction longitudinal of said conductors.

9. In combination, an elongated enclosing sheath, a pair of insulators secured within said sheath and disposed in spaced relationship, support means interposed between opposed surfaces of said insulators and secured thereto, a pair of elongated conducting members arranged in spaced substantially parallel relationship to each other and transversely disposed with respect to said insulators and with said support means interposed between said conducting members, and clamping means attached to opposed surfaces of said conducting members and spaced from said support means so as to accommodate axial movement of said conducting members relative to said support means.

NATHAN SWERDLOW.
GEORGE G. ABEL.

References Cited in the file of this patent

UNITED STATES PATENTS

| Number | Name | Date |
|---|---|---|
| 1,495,770 | Brown | May 27, 1924 |
| 1,541,756 | Williams | June 9, 1925 |
| 2,057,273 | Little | Oct. 13, 1936 |
| 2,084,580 | Frank | June 22, 1937 |
| 2,134,849 | Arnold | Nov. 1, 1938 |
| 2,144,247 | Scott | Jan. 17, 1939 |
| 2,170,298 | Frank | Aug. 22, 1939 |
| 2,216,870 | Adarn | Oct. 8, 1940 |
| 2,223,300 | DeBellis | Nov. 26, 1940 |
| 2,275,235 | Shanklin | Mar. 3, 1942 |
| 2,337,316 | Dodge | Dec. 21, 1943 |
| 2,341,311 | Carlson | Feb. 8, 1944 |
| 2,422,379 | Westman | June 17, 1947 |
| 2,442,545 | Koch | June 1, 1948 |
| 2,469,445 | Scott | May 10, 1949 |
| 2,515,255 | O'Brien | July 18, 1950 |